No. 887,624. PATENTED MAY 12, 1908.
M. GOODFELLOW.
STEERING MECHANISM FOR AGRICULTURAL IMPLEMENTS.
APPLICATION FILED MAR. 9, 1907.
4 SHEETS—SHEET 1.
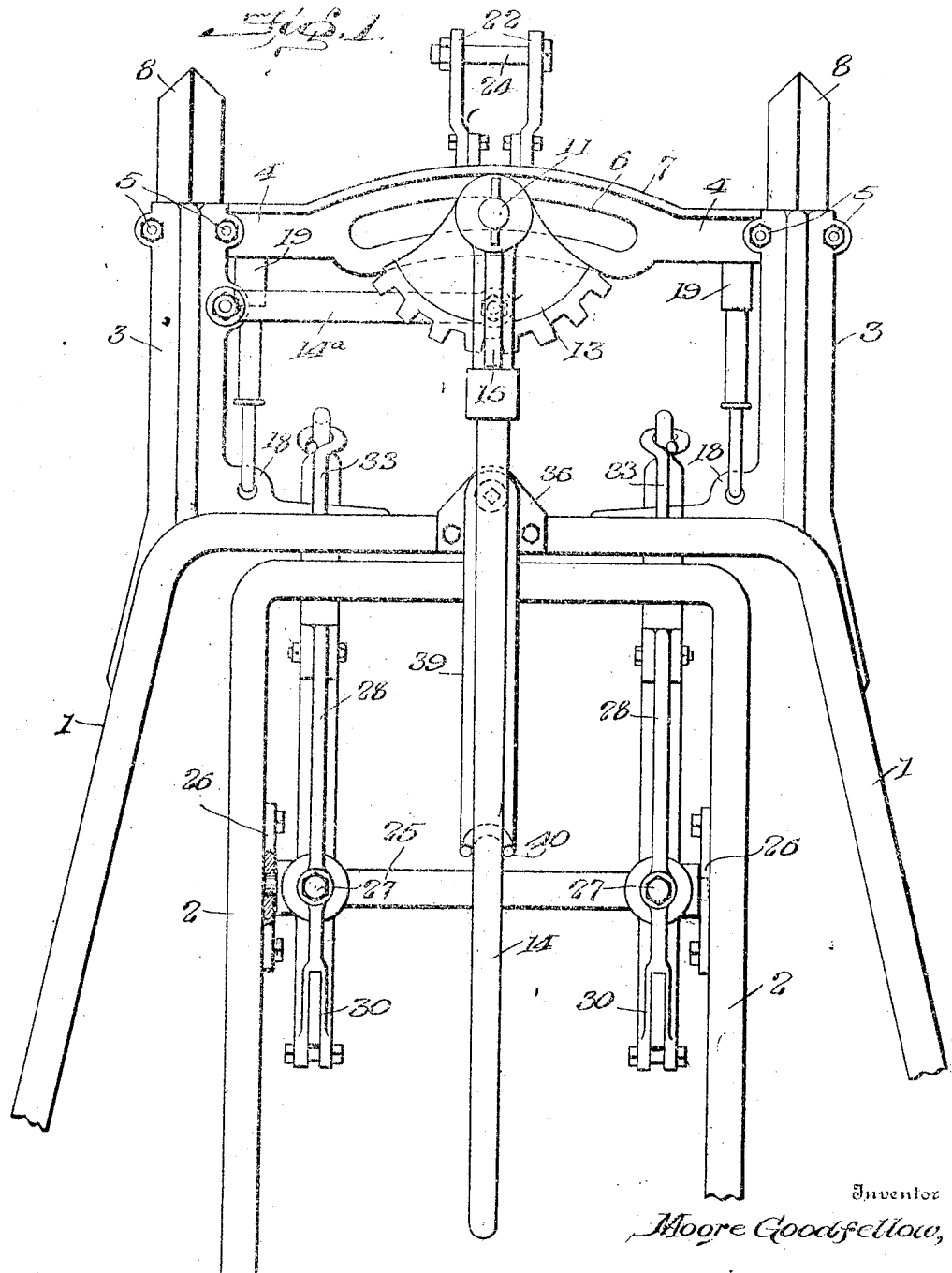
Witnesses
G. Howard Walmsley
Edward T. Reed
Inventor
Moore Goodfellow,
By H. A. Toulmin,
Attorney

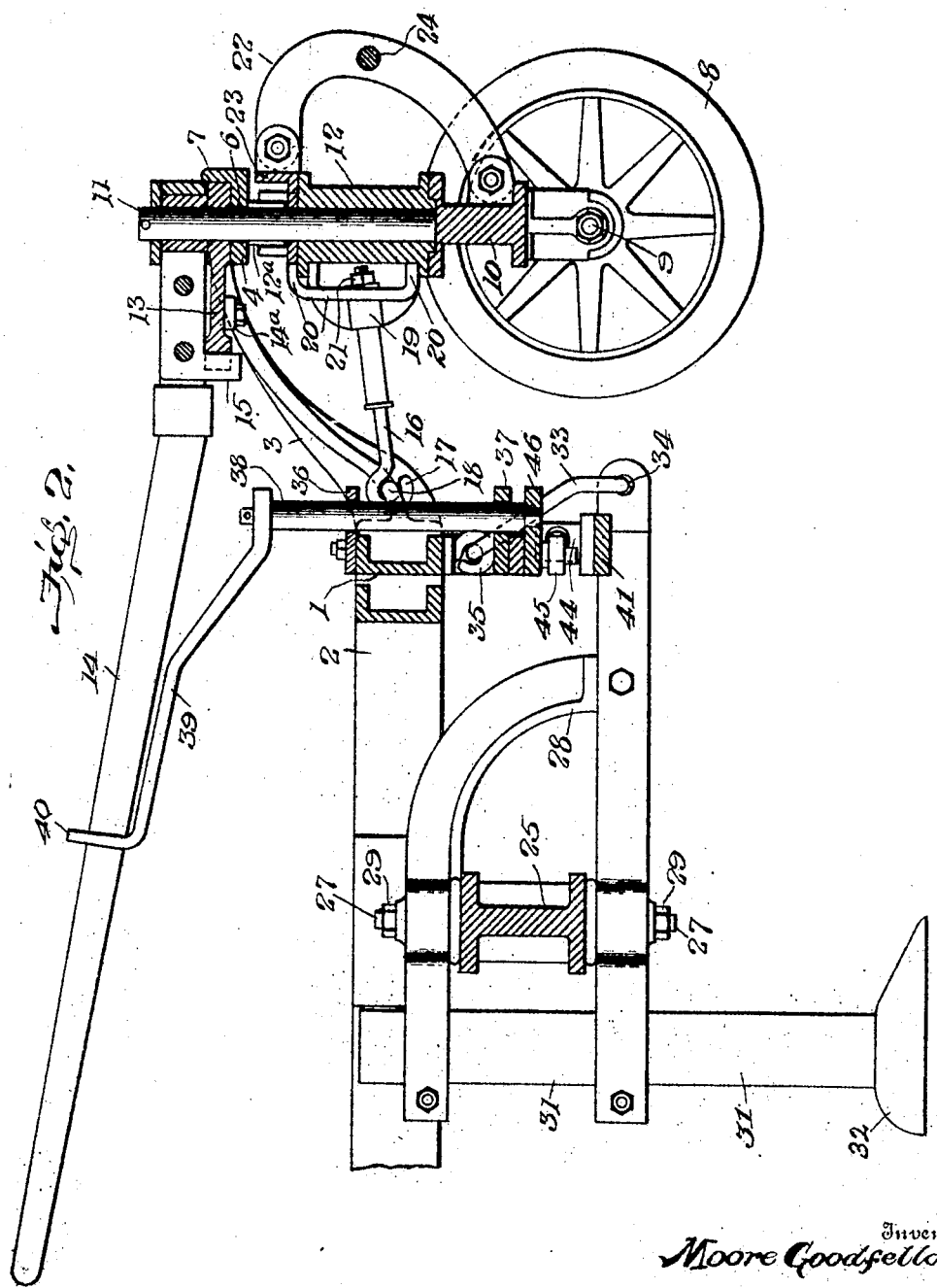

No. 887,624. PATENTED MAY 12, 1908.
M. GOODFELLOW.
STEERING MECHANISM FOR AGRICULTURAL IMPLEMENTS.
APPLICATION FILED MAR. 9, 1907.
4 SHEETS—SHEET 3.
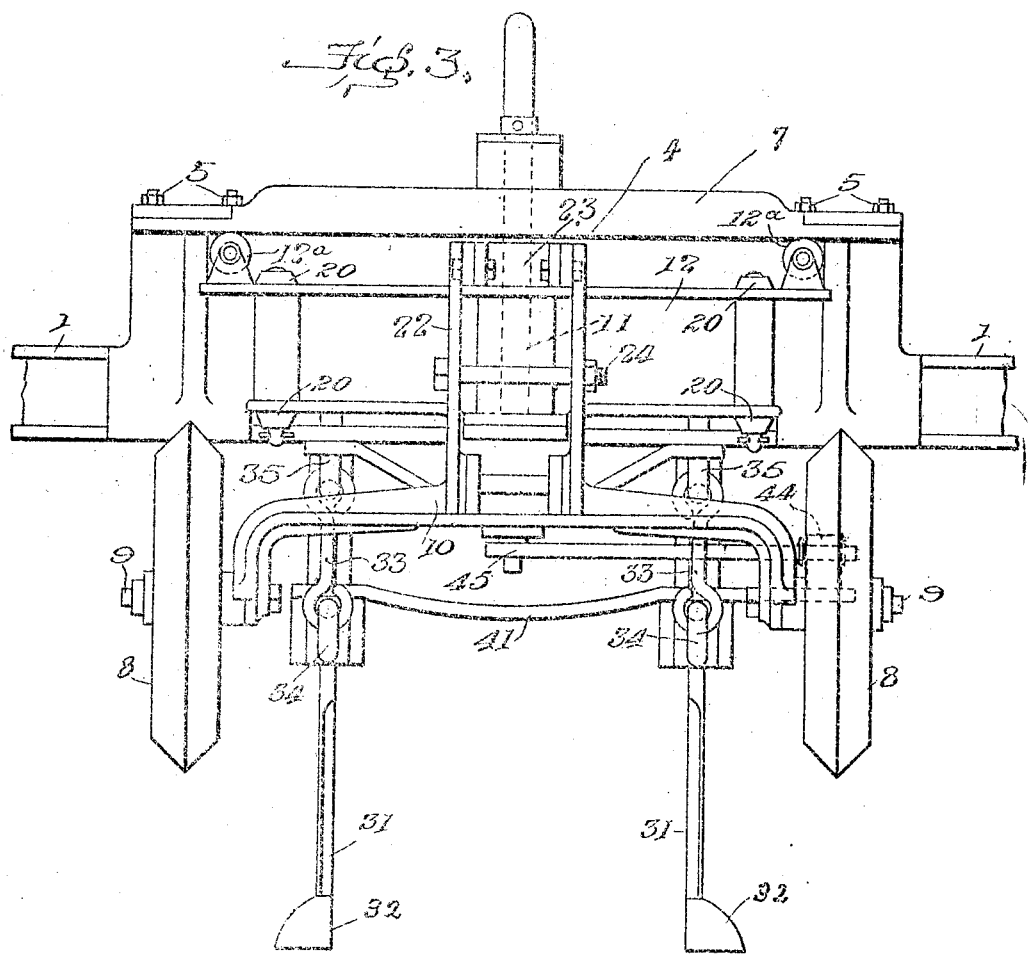

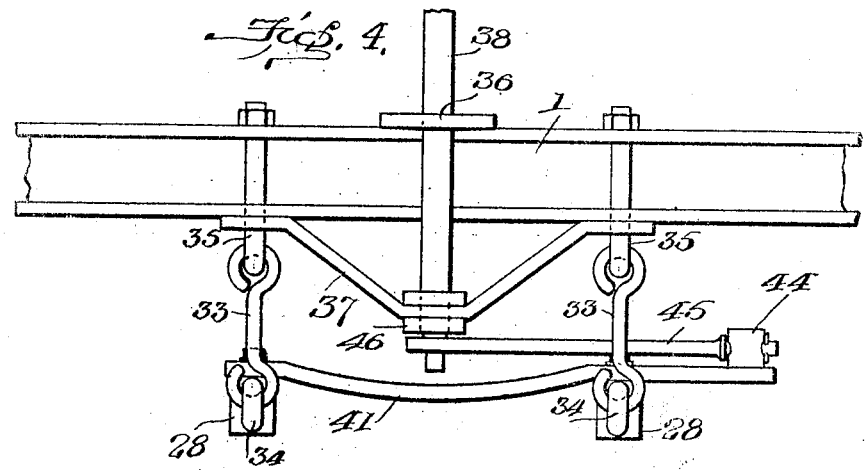
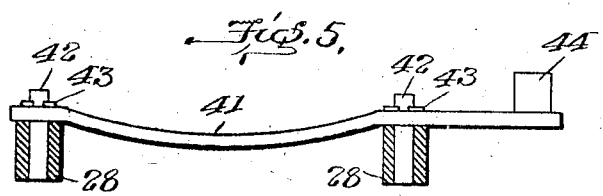
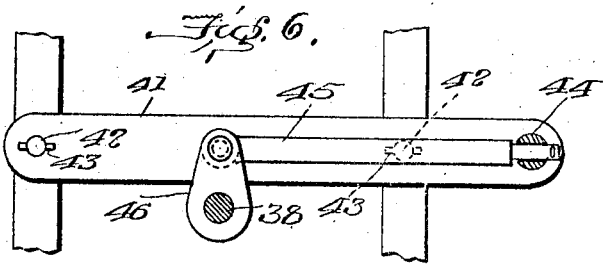

UNITED STATES PATENT OFFICE.

MOORE GOODFELLOW, OF COLUMBUS, OHIO, ASSIGNOR OF ONE-HALF TO JOSEPH O. DYE, OF COLUMBUS, OHIO.

STEERING MECHANISM FOR AGRICULTURAL IMPLEMENTS.

No. 887,624.   Specification of Letters Patent.   Patented May 12, 1908.

Application filed March 9, 1907. Serial No. 361,587

*To all whom it may concern:*

Be it known that I, MOORE GOODFELLOW, a citizen of the United States, residing at Columbus, in the county of Franklin and State of Ohio, have invented certain new and useful Improvements in Steering Mechanism for Agricultural Implements, of which the following is a specification, reference being had therein to the accompanying drawings.
The present invention relates to steering mechanism for agricultural implements, and more particularly to steering trucks for beet harvesters.

The object of the invention is to provide a steering mechanism of this character, whereby the direction of travel of the implement or machine, may be controlled either by altering the direction of travel of the draft animal or other source of power employed in drawing the machine, or may be altered by manually operated mechanism controlling the direction of travel of the machine without changing the direction of travel of the draft animal, and further to provide means whereby the colters employed in the beet harvesters and similar machines may be turned about a vertical axis and caused to serve as rudders and to facilitate and assist in steering of the machine, rather than to act as a drag and resist the steering of the machine, as is the case where colters are rigidly secured in position.

With these objects in view, my invention consists of certain novel features of construction to be hereinafter described, and then more fully pointed out in the claims.

In the accompanying drawings, Figure 1 is a top plan view of the forward portion of a beet harvester embodying my invention;
Fig. 2 is a longitudinal sectional view taken centrally through Fig. 1; Fig. 3 is a front elevation of the same; Fig. 4 is a front elevation of the colter steering mechanism. Figs. 5 and 6 are fractional detail views of the same.

In these drawings I have illustrated my invention in its preferred form, and have shown the same as embodied in a beet harvester; but obviously the invention could be readily adapted to other machines or implements.

The main frame of the beet harvester is indicated by the reference numeral 1, while the numeral 2 represents an auxiliary frame, which is mounted within the main frame and is capable of a vertical movement relatively thereto. The main frame is provided with an extension or bracket comprising forwardly and upwardly extending arms 3, which are connected at their outer ends by a transverse member or bar 4, which is secured to the ends of the arms 3 in any suitable manner, such as by means of the bolts 5. This bar 4 is provided near its central portion with a curved slot 6 of considerable length relatively to the length of the bar. The bar is further provided along its forward edge with an upwardly extending flange 7, the bar and flange being curved to conform to the curve of the slot 6.

The steering truck comprises the wheels 8, mounted upon suitable axles 9, which are carried by the connecting member or yoke 10, which is provided near its central portion with an upwardly extending part 11, which, in the present instance, is in the form of a king bolt. The king bolt 11 extends upwardly through the bolster 12, which is supported thereon, and through the slot 6 in the transverse bar 4. The bolster 12, which is mounted between the yoke 10 and the extension to the main frame, may, if desired, be provided on its upper surface with suitable antifriction rollers 12ª, adapted to engage the lower surface of the transverse member 4 of the extension and facilitate the movement of the extension and the frame transversely of the line of travel of the truck. Loosely mounted upon the king bolt 11, immediately above the bar 4, is a toothed segment 13, and immediately above the segment 13 is journaled one end of the steering lever 14, which is provided with a downwardly extending part or lug 15, adapted to engage between the teeth of the segment 13. The segment 13 serves as a crank arm and is connected to the main frame by a link 14ª, which is pivotally connected to the segment near the outer extremity thereof and to one of the arms 3 of the extension to the main frame. Thus, it will be seen that when the lever is actuated and the segment turned about its pivotal center, on the king bolt 11, that the link 14ª will move the extension 3, and main frame 1, transversely of the truck and king bolt, this movement being permitted by the slots 6 in the extension to the main frame through which the king bolt 11 extends. The bolster 12, which is mounted upon king bolt 11, is connected to the main frame by connecting links or rods 16, which, in the present instance, are in the form of rods provided at one end with hooks 17, adapted to engage eyes or rings 18, carried by the main frame 1, and having the other end adapted to extend through a bearing or sleeve 19, formed in a bracket or yoke 20, pivotally secured to the bolster 12, and provided with a nut 21 on that end of the rod which extends beyond the sleeve or bearing 19, thus enabling the rod to be shortened or lengthened to vary the distance between the truck and the main frame. A slight rearward movement of the bolster 12 and king bolt 11 occurs when the frame is moved laterally of the truck, owing to the pivotal connection between the bolster and the frame, which rearward movement is permitted by the curvature of the slot 6 in the member 4.

It is desirable that the line of draft should be as nearly as possible in alinement with the connecting rods 16, which connect the truck to the main frame of the implement, and serve as a draft coupling between these two members. In order to bring the draft hitch as nearly as possible in alinement with rod 16, I provide a curved arm 22, substantially semi-circular in shape and secured at its lower end to the yoke or connecting member 10, of the truck and its upper end to a collar 23, which is mounted on the king bolt 11, between the bolster and the transverse bar 4. The arm 22 is provided with an aperture 24, or other suitable means, to which the draft hitch may be coupled. The bar or beam 25 extends transversely of the auxiliary frame 2, and is journaled at its opposite ends in suitable brackets 26, secured to said auxiliary frame. The beam 25 is provided near its opposite ends with vertical bolts 27, which extend beyond the beam 25, above and below the same, and support the bifurcated brackets or beams 28, the arms of which extend on opposite sides of the beam 25, and are journaled on the projecting ends of the bolts 27 which are provided with nuts 29, or other suitable means, for retaining the brackets in position on the bolts or stud shafts 27. Thus it will be seen that each bracket 28, has a rotary movement about the horizontal axis of the beam 25, and also a rotary movement about the vertical axis of the bolts or stud shafts 27.

The arms of the bifurcated brackets 28, extend for some distance in the rear of the beam 25, and are provided with slots 30, or other suitable means for supporting the shank 31 of the colters 32, which may be of any suitable construction. The forward end of each beam or bracket 28, extends slightly beyond the front end of the main frame 1, and is pivotally connected thereto in any suitable manner, such as that shown, which consists of a link 33, pivotally connected to the forward end of the bracket or beam 28, and to the main frame 1, and which preferably consists of a rod having hooks at its opposite ends adapted to engage the aperture 34 in the beam 28 and the eye or ring 35 secured to the lower side of the frame 1. The main frame 1, is provided with suitable brackets 36 and 37 in which is journaled the vertical shaft 38, the bracket 37 being preferably depressed some distance below the lower surface of the frame 1, thus supporting the shaft 38 near its lower end. The shaft 38 is provided near its upper end with an arm 39 which is rigidly secured thereto at one end and at the other end is provided with an upwardly extending bifurcated portion 40, the arms of which extend on opposite sides of the steering lever 14. The beams 28 of the colters 32 are connected near their forward ends by a transverse member or bar 41 which is secured to the beams in any suitable manner, preferably by means of pins 42 and keys 43. The bar 41 extends at one end beyond the adjacent beam 28 and is provided near the outer end thereof with the apertured lug 44 which is pivoted therein and is adapted to receive the end of the rod 45 which connects lug 44 with a crank arm 46 which is rigidly secured to the lower end of the shaft 38.

The operation of the steering mechanism will be readily understood from the foregoing description. In brief it is as follows; With the members in their normal position, as shown in the drawing, the main frame 1 of the implement will follow in the line of draft of the steering truck. When it is desired to alter the direction of travel of the implement the steering lever 14 is operated to move the toothed segment 13, which serves as a crank arm, about the king bolt 11 and through the medium of the connecting link 14ª the main frame is moved in a direction transverse to the direction of travel of the truck, and is moved out of the line of draft of said truck. The movement of the lever 14 also serves to actuate the vertical shaft 38 and through the medium of the crank arm 46 and connecting link or rod 45 to move the colter beams 28 about their vertical axes, thus altering the position of the colters, and causing the same to serve as rudders and assist in the steering of the machine. When the auxiliary frame 2, is elevated to move the colter out of engagement with the earth, it is desirable that the colter should travel a greater distance than the distance traveled by the auxiliary frame. This is accomplished by mounting the colter beams upon the transverse beam 25, which is journaled in brackets carried by the auxiliary frame. Thus it will be seen that as the auxiliary frame 2 moves vertically relatively to the frame 1, the links 33 hold the forward ends of the colter beams 28 against vertical movement as the auxiliary frame moves upward, and rotate the beams 28 about their horizontal axes, thus elevating the rear end of the beam, which carries the colters, at a greater rate of speed than that at which the auxiliary frame is moving. The slight rearward movement of the beams, which is due to the fact that the auxiliary frame 2, moves about a pivotal center, is compensated for by the links 33 which are pivotally connected to the ends of the colter beams and to the main frame.

I wish it to be understood that I do not desire to be limited to the exact details of construction shown and described for obvious modifications will occur to a person skilled in the art.

Having fully described my invention, what I claim as new and desire to secure by Letters Patent, is:—

1. In a steering mechanism, the combination, with a truck, and a frame having a part supported on said truck and having a slot extending transversely of said frame, of a part carried by said truck extending through said slot and freely movable therein, a draft coupling loosely connecting said truck to said frame, and actuating means operatively connected to said frame, whereby said frame may be moved transversely of said truck and when unrestrained will return to its normal position.

2. In a steering mechanism, the combination, with the frame and a part carried thereby and provided with a slot extending transversely of said frame, of a truck, a king bolt carried by said truck and extending through said slot, and means connecting said truck and said frame and adapted to move said frame transversely of the line of travel of said truck.

3. In a steering mechanism, the combination, with a frame, and a part carried thereby and having a curved slot extending transversely of said frame, of a truck having an upwardly extending part engaging said slot, means for connecting said truck and said frame, and means for actuating said connecting means to move said frame transversely of the line of travel of said truck.

4. In a steering mechanism, the combination, with the frame and a part carried thereby and provided with a slot extending transversely of said frame, of a truck having a part extending through said slot, an arm pivotally mounted on said truck and connected to said frame, and means for moving said arm about its pivotal center to move said frame transversely of the line of travel of said truck.

5. In a steering mechanism, the combination, with the frame and a part carried thereby and provided with a slot extending transversely of said frame, of a truck having an upwardly extending part engaging said slot, an arm pivotally mounted on said upwardly extending part, a link connecting said arm to said frame, and a steering lever adapted to engage said arm and actuate the same to move said frame, transversely of the line of travel of said truck.

6. In a steering mechanism, the combination, with the frame and a part carried thereby and provided with a curved slot extending transversely of said frame, of a truck having a part extending through said slot, a freely movable draft coupling extending between said truck and said frame, and means connecting said truck and said frame and adapted to move said frame transversely of the line of travel of said truck.

7. In a steering mechanism, the combination, with the frame and a part carried thereby and provided with a curved slot extending transversely of said frame, of a truck having a part extending through said slot, adjustable draft couplings extending between said truck and said frame and loosely connecting the same, and means for moving said frame transversely of the line of travel of said truck.

8. In a steering mechanism, the combination, with the frame, an extension carried by the forward end of said frame and having a curved slot therein, of a truck having a part adapted to engage said slot, draft couplings loosely connecting said truck to said frame and means for moving said frame transversely of the line of travel of said truck.

9. In a steering mechanism, the combination, with the frame, forwardly and upwardly extending arms secured to the opposite sides of said frame and a transverse member connecting the forward ends of said arms and having a slot therein, of a truck, a king bolt carried by said truck and extending through said slot, draft couplings connecting said truck to said frame, an arm pivotally mounted on said king bolt above said transverse member, a link connecting said arm to one of said arms, a steering lever pivotally mounted on said king bolt and having a part adapted to engage said arm to actuate the same and move said frame transversely of the line of travel of said truck.

10. In a steering mechanism, the combination with the frame and a part carried thereby and provided with a slot extending transversely of said frame, of a truck having a part extending through said slot, a bolster mounted on said truck, draft couplings connecting said bolster to said frame, a draft hitch coupling mounted on said truck in substantial alinement with said draft couplings and means for moving said frame transversely of the line of travel of said truck.

11. In a steering mechanism, the combination, with the frame and a part carried thereby and provided with a slot extending transversely of said frame, of a truck having a part extending through said slot, a bolster carried by said truck, draft couplings connecting said bolster to said frame, a draft hitch coupling comprising a curved member secured at one end of said truck below said bolster and at the other end to said truck above said bolster, and means for moving said frame transversely of the line of travel of said truck.

12. In a steering mechanism, the combination, with the main frame, a truck supporting one end of said frame, and operating means for moving said frame transversely of the line of travel of said truck, of a colter beam supported within said main frame and capable of movement about a vertical axis, a colter carried thereby, and means for connecting said colter beam to said operating means, whereby said colter beam is moved about its vertical axis simultaneously with the movement of said frame transversely of the line of travel of said truck.

13. In a steering mechanism, the combination, with the main frame, a truck supporting one end of said frame, and operating means for moving said frame transversely of the line of travel of said truck, of a colter beam mounted within said main frame and capable of movement about a vertical axis, a colter carried thereby, a vertical shaft mounted on said main frame and having one end operatively connected to said operating means, a crank arm carried by said shaft and connected to said colter beam, whereby said beam is moved about its vertical axis simultaneously with the movement of said frame transversely of the line of travel of said truck.

14. In a steering mechanism, of the character described, the combination, with the main frame, the truck supporting one end of said frame and an operating lever for moving said frame transversely of the line of travel of said truck, of a colter beam mounted within said main frame and capable of movement about a vertical axis, a colter carried thereby, a vertical shaft mounted on said main frame, an arm rigidly secured to the upper end of said vertical shaft and connected with said steering lever, a crank arm secured to the lower end of said shaft and a link connecting said crank arm to said colter beam.

15. In a steering mechanism, the combination with the main frame, a truck supporting one end of said main frame and a steering lever for moving said frame transversely of the line of travel of said truck, of a plurality of colter beams mounted within said main frame and capable of movement about their vertical axes, colters carried by each of said beams, a transverse member connecting the forward ends of said beams and projecting beyond the beam at one end thereof, a lug pivotally mounted on the projecting end of the said transverse member, a vertical shaft mounted on said main frame, an arm rigidly secured to the upper end of said shaft and connected with said steering lever, a crank arm secured near the lower end of said shaft and a link connecting said crank arm to said pivoted lug.

16. In a steering mechanism, the combination with the main frame, a truck supporting one end thereof and a steering lever for moving said main frame tranversely of the line of travel of said truck, of an auxiliary frame mounted within said main frame and capable of a vertical movement relatively thereto, a transverse member journaled in said auxiliary frame, colter beams pivotally mounted on said transverse member, colters carried by said beams, links connecting the forward ends of said colter beams to said main frame and means for connecting the forward ends of said colter beams to said steering lever, whereby said beams are moved in unison with said lever.

17. In a steering mechanism, the combination, with the main frame, the truck supporting one end of said main frame and a steering lever for moving the said main frame transversely of the line of travel of said truck, of an auxiliary frame mounted within said main frame and capable of a vertical movement relatively thereto, a transverse member journaled in said auxiliary frame, colter beams pivotally mounted near the opposite ends of said transverse member, colters carried by said beams, links connecting the forward ends of said colter beams to the said main frame, a transverse bar pivotally connected to each of said beams near their forward ends and extending beyond the beam at one end thereof an apertured lug pivotally mounted on the projecting end of said transverse bar, a vertical shaft journaled on said main frame, an arm rigidly secured to said shaft near its upper end and connected with said steering lever, a crank arm secured to said shaft near its lower end, a link pivotally connected at one end of said crank arm and having its other end loosely mounted in said apertured lug.

18. In a steering mechanism, the combination, with a frame, an extension carried by the forward end of said frame and having a slot therein, of a truck having a part adapted to engage said slot, a bolster carried by said truck, antifriction rollers interposed between said bolster and said extension, and means for moving said extension transversely of the line of travel of said truck.

19. In a steering mechanism, the combination, with a frame, and a part carried thereby and provided with a slot extending transversely of said frame, of a truck having an upwardly extending part engaging said slot, a toothed segment pivotally mounted on said upwardly extending part, means for connecting said toothed segment to said frame, and a steering lever having a part adapted to engage between the teeth of said segment and to actuate the same to move the frame transversely of the line of travel of said truck.

In testimony whereof, I affix my signature in presence of two witnesses.

MOORE GOODFELLOW.

Witnesses:
 E. G. LLOYD,
 LEO HOLLAND.